Patented Aug. 14, 1945

2,382,698

UNITED STATES PATENT OFFICE 2,382,698

HYDRAULIC MEDIA

Theodore R. Donlan, Union, N. J., assignor to Standard Oil Development Company, a corporation of Delaware No Drawing. Application June 29, 1940, Serial No. 343,159

4 Claims. (Cl. 252—75)

This invention relates to liquid compositions adapted for use in circulating systems to effect heat or pressure transfer under low temperatures and particularly to such type compositions which are substantially non-corrosive and non-foaming.

Quality in heat and pressure transmitting liquids for service in systems operating over a range of extreme atmospheric temperature conditions is determined by many characteristics, all of which except freezing point and coefficient of expansion upon solidification, are possessed by water to a desirable degree. These two characteristics preclude the use of water alone in circulating systems, any part of which is liable to be exposed to a temperature below freezing point. In the endeavor to utilize the desirable properties of water, many aqueous solutions have been proposed as more satisfactory hydraulic media. The improvements effected by the use of those solutions are mainly with regard to a lower freezing point and the formation of highly viscous or semi-solid masses at temperatures before the point of complete solidification is reached. These improvements have been achieved at the expense, notably, of chemical stability and surface tension.

The freezing point depressants which have been employed have consisted of electrolytes such as calcium chloride or sodium lactate and nonelectrolytes such as the alcohols up to five carbon atoms in the molecule and various carbohydrates. Of these compounds the alcohols have been more generally employed because they are less readily corrosive. The alcohols which are particularly useful for this purpose are methyl, ethyl, the propyl and the butyl alcohols; the glycols, especially the 1-2 glycols of which the ethylene and propylene glycols are worthy of special mention; and glycerol.

The lower alcohols, especially the glycols and glycerols, loosen and detach from the walls of the confining vessels materials such as iron rust which with water alone remain attached. This material, especially in forced circulation systems, collects in the pipes and finally clogs the system. Furthermore, an alcoholic solution has a lower surface tension than that of water and as a result the solutions pass through many solder pores and minute crevices through which water alone does not usually seep, and, if at any point in the system, air is drawn in appreciable foaming occurs. These effects are more pronounced as corrosion material on the walls of the confining vessels is removed and carried in the circulating liquid. Foaming is particularly objectionable in the cooling system of automobile engines since the foam is produced mainly in the pump and as a result, circulation is impeded and the liquid is forced from the system through the overflow pipe. These are significant defects in any hydraulic medium.

The corrosive tendencies of anti-freeze solutions, as liquid hydraulic media suitable for use at low temperatures are usually termed, have been found in the past to be the result of the formation of acidic oxygen compounds and the effects of electrolytes. Hydrogen ion concentration has also been found to be a determining factor in the corrosion of most metals. Iron, for example, is not corroded by aqueous solutions having a pH value numerically greater than 9.4. In the past, alkaline substances of the type of caustic soda and soaps have been added to reduce the corrosiveness of solutions towards the metal parts of heat exchanger equipment. The soap compounds which were added included the alkali derivatives of the higher fatty acids, such as the sodium and potassium stearates, palmitates, oleates, laurate, and the derivatives of these acids with ammonia and organic bases such as triethanolamine, ethylamine, cyclohexylamine. Such additions give temporary effects only. In endeavoring to stabilize the corrosion inhibiting effects of these compounds by the addition of buffer salts, the resultant compositions were found to be disadvantageous because of excessive foaming. The present invention is an improvement in the art of preparing anti-freeze solutions, wherein the corrosion inhibiting effects are stabilized and excessive foaming is eliminated.

It is an object of this invention to prepare hydraulic media for both heat and pressure transmission purposes which have a highly desirable temperature range of liquid condition involving high heat capacities and low viscosity characteristics coupled with chemical inertness and physical properties which render the compositions substantially non-corrosive to the metallic and non-metallic parts of confining equipment and also are substantially non-foaming and show little tendency to creep under service conditions.

A particular object of this invention is the preparation of anti-freeze solutions generally satisfactory in performance and chemical stability characteristics particularly as regards non-foaming when used in the cooling system of internal combustion engines.

Other objects of the invention will be apparent from reading the following description.

The compositions of the invention have in addition to the usual constituents of hydraulic media suitable for use at low temperatures one or more alkyl phthalates in relatively small amounts. It has been found that the small quantities of alkyl phthalates in the compositions are particularly effective in reducing foaming and also are mild anti-corrosive agents. These effects appear to be common to all alkyl phthalates and more particularly to the dialkyl phthalates having alkyl groups of less 10 carbon atoms in the molecule.

The non-foaming and non-corrosive antifreeze compositions within the scope of the invention comprise a water-soluble alcohol having up to about 5 carbon atoms in the molecule such as a monohydric alcohol, a glycol, especially a 1-2 glycol, glycerol or a mixture thereof; water; and an alkyl phthalate. Usually, however, in addition to these ingredients there are present a corrosion inhibitor, such as an organic amine or an inorganic nitrite; suitable alkalizing and buffer compounds; and an antileak agent such as linseed meal; according to the service for which the composition is adapted.

In preparing compositions according to the invention, a concentrated composition is first prepared, and then by diluting the concentrate with water in various amounts, hydraulic media of various freezing points are prepared. The composition of a basic concentrate may be exemplified by the following:

|  | Percent |
|---|---|
| Mixture of ethylene and propylene Glycols (specific gravity 1.0775) | 97.5 |
| Water | 2.5 |

To which is added:

|  | g./gallon |
|---|---|
| Sodium nitrite | 4 |
| Sodium carbonate | 12 |
| Disodium phosphate | 4 |
| Linseed meal | 5 |
| Calcozine Red BX dye | 0.08 |

The alkyl phthalates are incorporated in such concentrates in an amount between 0.1% and 1% by weight. The resultant blended compositions are then diluted with various quantities of water. Thus, 15% aqueous solution had a freezing point of about 20° F.; a 27.5% solution, a freezing point of about 10° F.; and 35% solution, a freezing point of about 0° F.

In the preparation of concentrated compositions according to the invention, the mixtures of ethylene and propylene glycols may vary in the ranges from 90% to 10% ethylene glycol and from 10% to 90% propylene glycol. Instead of a mixture of these glycols, a mixture of any of the several 1-2 glycols containing up to about 5 carbon atoms may be employed. Glycerol may also be used. The advantages of employing the glycols and glycerol are that in addition to their water solubilities and low freezing and high boiling points, the compositions at low temperatures form slurry or highly viscous masses previous to solidification and the pressure exerted upon complete solidification is insufficient to cause crack-in or breaking of the metallic walls of the confining equipment. The glycols are preferable to glycerol in the preparation of anti-freeze solutions for automobiles because glycerol in contact with piston valves and other engine parts into which the solution may come into contact in service produces a sticky or resinous material necessitating in many cases costly repairs. The amounts in which the glycols and glycerol are used are roughly those given for the mixture of the glycols in the above specific example.

The amount of water in the concentrated composition is roughly that given in the specific example.

Instead of sodium nitrite as corrosion inhibitor, other inorganic nitrites may be used, especially potassium and calcium nitrites. Organic amines are advantageous corrosion inhibitors in many cases. In an automobile radiator many metals occur in contact with each other. Electrolytic effects play a considerable part in the corrosion of automobile radiators. For this reason it has been found advisable in many cases to employ a mixture of corrosion inhibitors rather than any one individually. Organic amines which have been found especially advantageous are cyclohexylamine and dicyclohexylamine. The amounts in which the various corrosion inhibitors are used depend greatly upon service to which the hydraulic media are to be adapted, but in general the amounts are about that given for sodium nitrite in the specific example.

The sodium carbonate and disodium phosphate given in the specific concentrated compositions are examples of a buffer combination for a pH range of between 10 and 11.5. Other buffer combinations functioning over this pH range and which are soluble in the final compositions and which do not react with the other constituents to form electrolytes having undesirable corrosive tendencies may be employed.

A disadvantage of using alcohol compounds in the preparation of anti-freeze solutions is their characteristic of imparting to the composition a lower surface tension than water and thus causing increased creepage effects. This activity is counteracted in the compositions of the invention by the addition to the mixture of compounds of the type of linseed meal. Other compounds which may be used to reduce this form of leakage are gum gambier, tragacanth, quince seed, Irish moss and their mixtures. Other well dispersed solids may be included such as paper pulp, aluminum bronze, etc., but in general linseed meal is preferred because of the superior results obtained and the clean appearance. This meal when used is obtained by grinding linseed and then passing through a 40 mesh screen to eliminate the husks. The amounts in which these materials are incorporated in the concentrated composition are approximately those given for linseed meal in the specific example.

It has been found that the alkyl phthalates of both straight and branched chain structures as groups are effective as anti-foaming agents in anti-freeze solutions. The dialkyl phthalates having alkyl groups containing up to about 10 carbon atoms in the molecule are very desirable in this regard, and of this group the butyl, pentyl, hexyl, heptyl and octyl phthalates are particularly effective. The butyl phthalates have been found to be especially desirable in anti-freeze solutions adapted for use in automobile radiators. The alkyl phthalates are also mild corrosion inhibiting agents and inhibit in some cases the deterioration of rubber, features of particular importance in the use of compositions as anti-freeze solutions for automobile radiators. The amounts in which the various alkyl phthalates are employed depend on the particular phthalate compound, the other constituents of the anti-freeze composition and the service to which the blended composition is to be applied. Usually, however, the amount is between about 5 grams and 40 grams per gallon of concentrated composition, that is, between about 0.1% and 1% by weight, and in this range the preferred amounts are of the order from 0.3% to 0.75% by weight.

In a series of tests to exemplify the effects of normal butyl phthalate, secondary butyl phthalate, and normal octyl phthalate in anti-freeze compositions, three samples of the basic concentrate of the composition previously stated in this description were taken and blended respectively with these phthalate compounds in amounts of 20 cc. per gallon, that is about 0.5% by weight, of the concentrated composition. The three blended compositions and an unblended concentrate were diluted with water in amounts of one and one half times their volumes respectively. Thus were prepared anti-freeze compositions containing about 0.2% by weight of the phthalate compounds and having freezing points of about −10° F. and pH values of about 10.5. 175 cc. of each of these solutions were shaken vigorously in 250 cc. tall graduate cylinders for one minute, after which the height and type of foam were noted and also the time noted for the foam to break and expose a portion of the liquid surface. The following data were obtained:

|  | Phthalate compounds | | | |
| --- | --- | --- | --- | --- |
|  | No phthalate | n-Dibutyl | Sec. dibutyl | n-Octyl |
| Initial foam $\frac{\text{height of foam}}{\text{height of liquid}}$ | 20% | 14% | 3% | 14%. |
| Type of foam | Coarse | Medium | Medium | Fine. |
| Time to expose liquid surface | 30 min | 10 sec | 5 sec | 50 sec. |

This comparison of data indicates that the alkyl phthalates reduce the amount of foam produced and that of the foam produced in the presence of the phthalates breaks more easily, and is of a finer texture and less obstructive in character than that produced in the absence of the phthalate compounds.

The hydraulic media prepared by diluting the concentrated compositions are liquid over a wide temperature range and when cooled to temperatures at which solidification commences highly viscous or semi-solid masses are obtained rather than immediately solid masses. In the various stages of dilution the compositions are essentially non-foaming and non-corrosive and little or no material is precipitated on to the surfaces of the confining vessels. Thus, with the negligible corrosion and the maintenance of clean heat transfer surfaces, the efficiency of the cooling system is maintained at a high standard by use of the compositions of the present invention.

It will be apparent to those skilled in the art that numerous modifications can be made in the compositions previously disclosed. These modifications are not excluded from within the scope of the present invention. It is intended to include all such modifications within the scope of the present invention and to be limited only by the appended claims.

It is claimed:

1. An anti-freeze solution suitable for use at low atmospheric winter temperatures in automobile engine cooling systems which comprises a mixture of specific gravity of about 1.0775 of ethylene and propylene glycols and water as main constituents, to which are added sodium carbonate and disodium phosphate in amounts to exert buffer action for the pH range of from 10 to 11.5, cyclohexylamine in corrosion inhibiting proportions and a butyl phthalate in an amount of about 0.2% by weight.

2. An anti-freeze solution according to claim 1 in which the butyl phthalate is secondary butyl phthalate.

3. An anti-freeze solution suitable for use at low atmospheric winter temperatures in automobile engine cooling systems which comprises a mixture of specific gravity of about 1.0775 of ethylene and propylene glycols and water as main constituents, to which are added sodium carbonate and disodium phosphate in amounts to exert buffer action for the pH range of from 10 to 11.5, sodium nitrite in corrosion inhibiting proportions and a butyl phthalate in an amount of about 0.2% by weight.

4. An anti-freeze solution according to claim 3 in which the butyl phthalate is secondary butyl phthalate.

THEODORE R. DONLAN.